(12) United States Patent
Yamaguchi

(10) Patent No.: US 9,483,216 B2
(45) Date of Patent: Nov. 1, 2016

(54) IMAGE FORMING SYSTEM AND IMAGE FORMING METHOD FOR SELECTING BETWEEN TWO SEPARATE IMAGE FORMING APPARATUSES

(71) Applicants: KABUSHIKI KAISHA TOSHIBA, Minato, Tokyo (JP); TOSHIBA TEC KABUSHIKI KAISHA, Shinagawa, Tokyo (JP)

(72) Inventor: Hiroshi Yamaguchi, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 103 days.

(21) Appl. No.: 14/309,797

(22) Filed: Jun. 19, 2014

(65) Prior Publication Data
US 2015/0370512 A1 Dec. 24, 2015

(51) Int. Cl.
*G03G 15/20* (2006.01)
*G06F 3/12* (2006.01)
*H04N 1/00* (2006.01)

(52) U.S. Cl.
CPC ........... *G06F 3/1219* (2013.01); *G06F 3/1256* (2013.01); *G06F 3/1261* (2013.01); *G06F 3/1285* (2013.01); *H04N 1/0049* (2013.01); *H04N 1/00472* (2013.01); *H04N 1/00474* (2013.01); *G06F 3/1286* (2013.01)

(58) Field of Classification Search
None
See application file for complete search history.

(56) References Cited

U.S. PATENT DOCUMENTS

| 8,934,141 | B2 * | 1/2015 | Hagiwara | G03G 15/6588 358/2.1 |
| 2010/0259780 | A1 * | 10/2010 | Shrader | G06F 11/34 358/1.15 |
| 2012/0082471 | A1 | 4/2012 | Terada | |
| 2012/0092713 | A1 * | 4/2012 | Hagiwara | G06F 3/1222 358/1.15 |
| 2012/0167181 | A1 * | 6/2012 | Yamaguchi | H04N 1/00244 726/4 |
| 2012/0251133 | A1 | 10/2012 | Shindo | |
| 2013/0064558 | A1 * | 3/2013 | Futamata | G03G 15/205 399/15 |
| 2013/0122412 | A1 * | 5/2013 | Niinuma | G03G 9/08 430/108.21 |
| 2015/0071673 | A1 * | 3/2015 | Yamaguchi | G03G 15/50 399/82 |
| 2015/0098107 | A1 * | 4/2015 | Yagi | G06F 3/1219 358/1.15 |

\* cited by examiner

*Primary Examiner* — David Gray
*Assistant Examiner* — Geoffrey T Evans
(74) *Attorney, Agent, or Firm* — Patterson & Sheridan, LLP

(57) ABSTRACT

An image forming system according to an embodiment includes: a first image forming apparatus that forms an image using a decolorable color material, a second image forming apparatus that forms an image using a non-decolorable color material, an information terminal that communicates over a network with the first and second image forming apparatuses. When a trial printing operation is initiated from the information terminal, the information terminal prompts a user for an input selecting the first image forming apparatus to perform the trial printing operation using the decolorable color material.

20 Claims, 6 Drawing Sheets

FIG. 6

IMAGE FORMING SYSTEM AND IMAGE FORMING METHOD FOR SELECTING BETWEEN TWO SEPARATE IMAGE FORMING APPARATUSES

FIELD

Embodiments described herein relate generally to an image forming system and an image forming method for performing trial printing.

BACKGROUND

A trial printing is performed in the related art so as to confirm whether or not an image formed using an image forming system would be formed in an intended state. When standard toner is used in the trial printing, a recording medium which is used in the trial printing must be discarded, and it is hard to reuse the medium.

Recently, an image forming system which forms an image using decolorable toner has been introduced as demand for resource saving has increased. When using decolorable toner in the trial printing, it is possible to reuse the recording medium which is used in the trial printing.

However, a user may not recognize that an image forming apparatus such as an MFP including a printer can form an image using the decolorable toner is connected to a network. Thus, the user may perform the trial printing using a normal printing mode. There is a problem in that trial printing using decolorable toner is not performed, and a sheet is wasted, even when an image forming apparatus in which the decolorable toner is used is connected to a network.

DESCRIPTION OF THE DRAWINGS

FIG. 6 is a diagram illustrating a display example of a printer driver user interface.

DETAILED DESCRIPTION

An image forming system according to an embodiment includes: a first image forming apparatus that forms an image using a decolorable color material, a second image forming apparatus that forms an image using a non-decolorable color material, an information terminal that communicates over a network with the first and second image forming apparatuses. When a trial printing operation is initiated from the information terminal, the information terminal prompts a user for an input selecting the first image forming apparatus to perform the trial printing operation using the decolorable color material.

Hereinafter, one embodiment of an image forming system, and an image forming method will be described in detail with reference to drawings.

Figure 1:
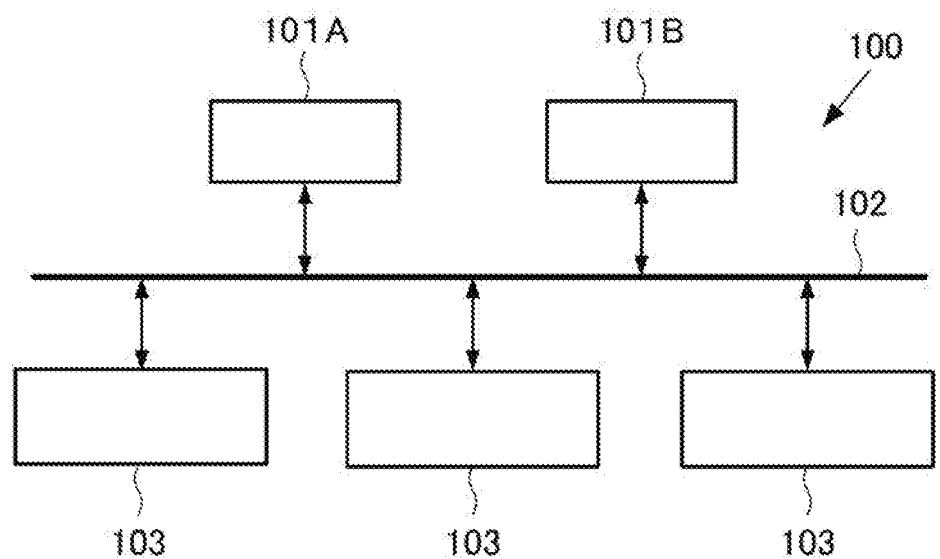
FIG. 1 is a diagram illustrating an example configuration of an image forming system.

FIG. 1 is a diagram illustrating a configuration example of main parts of an image forming system 100 including MFPs 101A and 101B. The Multi-Function Peripheral (MFP) 101A is a first image forming apparatus which can perform printing using a "decolorable color material" such as decolorable toner or decolorable ink. The MFP 101A can also printing using a "non-decolorable color material" such as normal toner or ink. The MFP 101B is a second image forming apparatus which can perform printing using a non-decolorable color material. The decolorable color material includes, for example, coloring compound, a developer, and a decoloring agent. The coloring compound is leuco dye, for example. The developer is phenols, for example. The decoloring agent is, for example, a substance which is compatible with the coloring compound when being heated, and does not have affinity with the developer. A color of the decolorable color material is developed by an interaction between the coloring compound and the developer, and is decolored when the interaction between the coloring compound and the developer is stopped by heating at a temperature equal to or higher than a decoloring temperature. Hereinafter, the non-decolorable color material will be described as non-decolorable toner, and the decolorable color material will be described as decolorable toner.

In addition, it is assumed that the MFP 101B may perform printing using the non-decolorable toner. However, the MFP 101B may also perform printing using only the decolorable toner, and may perform printing using the non-decolorable toner and the decolorable toner. Here, for convenience of explanation, it is assumed that one of two MFPs may perform printing using the non-decolorable toner, and the other MFP may perform printing using decolorable toner. In addition, the MFP 101B is not necessarily an MFP, and may be a single printer which may perform printing using the non-decolorable toner and the decolorable toner.

As illustrated in FIG. 1, the image forming system 100 connects a plurality of client personal computers (PC) 103, and MFPs 101A and 101B through a Local Network Area (LAN) 102 so as to communicate with each other. The client PC 103 is installed with printer drivers for performing printing in the MFPs 101A and 101B. The client PC 103 transmits a print job including printing data to be printed to the MFPs 101A and 101B.

The MFPs 101A and 101B perform printing and various processes relating to the printing based on the received print job.

Figure 2:
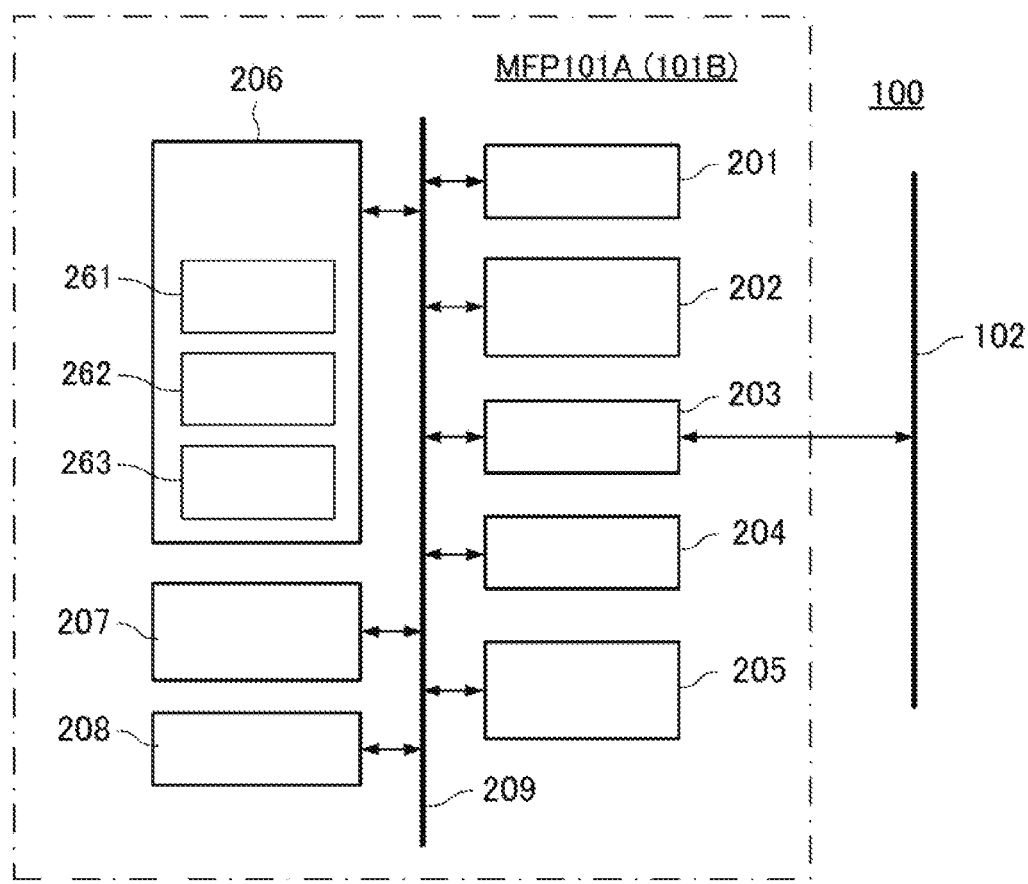
FIG. 2 is a block diagram illustrating a configuration of an image forming apparatus which is used in the image forming system.

FIG. 2 is a block diagram illustrating a configuration example of the MFP 101A (101B) which is the image forming apparatus used in the image forming system.

The MFP 101A includes a scanner 201, a printer controller 202, a communication unit 203, a storage unit 204, a printer engine 205, a control unit 206, a control panel 207, and a finisher 208. Each unit of the MFP 101A is connected using a bus 209.

The scanner 201 has a scanning function which reads an image from a recording medium such as a sheet, and generates image data corresponding to the image.

The printer controller 202 performs rasterizing processing based on a print job which is received from an external device, and generates raster data such as a bit map image from printing data included in the print job.

The communication unit 203 functions as a network interface which connects the MFP 101A to the LAN 102, and receives data such as a print job which is transmitted from the external device.

The storage unit 204 includes, for example, a hard disk, a flash memory, and a rewritable nonvolatile storage device other than that, and stores various data items which are handled by the MFP 101A. The data which is stored in the storage unit 204 includes the above described print job, image data which is read by the scanner 201, or the like, for example.

The printer engine 205 forms an image on a recording medium such as a sheet. The printer engine 205 forms an image using an electrophotographic method in which non-decolorable toner or decolorable toner is transferred onto the recording medium, and is fixed by being heated. In addition, since the MFP 101B does not include a function of transferring decolorable toner onto a recording medium in the printer engine 205 of the MFP 101B, the MFP 101B forms an image using only normal non-decolorable toner.

The control unit 206 controls operations of the MFP 101A. The control unit 206 includes at least a Central Processing Unit (CPU) 261, a Random Access Memory (RAM) 262, and a Read Only memory (ROM) 263. The control unit 206 reads a program or data corresponding to processing contents from the ROM 263 or the storage unit 204, executes processing thereof, and controls operations of each unit of the MFP 101A. The ROM 263 stores a program, data, or the like, which is used in processing of the CPU 261. The RAM 262 functions as a main storage unit for processing of the CPU 261.

The control panel 207 functions as a display unit which displays various information relating to the operations of the MFP 101A, and functions as an input unit which accepts various inputs with respect to the MFP 101A.

Here, the control panel 207 adopts a touch panel method which may accept an input using a contact operation or a pressing operation with respect to a button, or the like, which is displayed on the display unit. A configuration of the control panel 207 is not limited to the touch panel, may be a configuration in which the display unit and an input unit are individually provided, or a configuration in which the input unit using the touch panel method and an input unit which is separately provided are combined.

The finisher 208 performs a post-process with respect to a recording medium on which an image is formed, and is output using the printer engine 205. As the post-process using the finisher 208, for example, there is stapling, folding of a sheet, forming of punched holes, or the like. In addition, when performing trial printing, the post-process using the finisher 208 is omitted.

Figure 3:
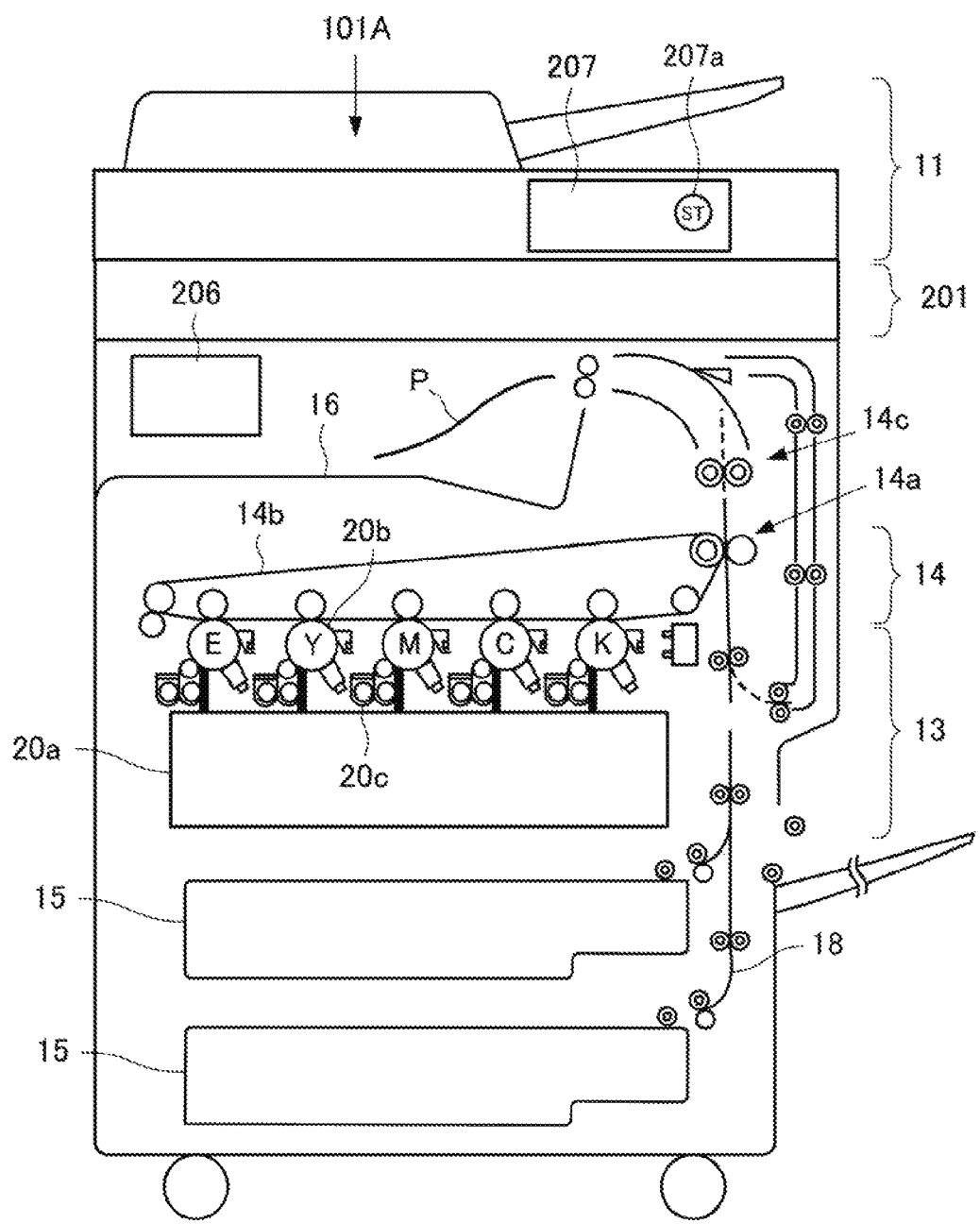
FIG. 3 is a diagram illustrating the configuration of the image forming apparatus.

FIG. 3 is a diagram illustrating a configuration of the MFP 101A which performs printing using the non-decolorable toner and the decolorable toner in the image forming system 100, according to the embodiment. As illustrated in FIG. 3, the MFP 101A includes the control unit 206, the control panel 207, an automatic document feeder 11, the scanner 201, an image forming unit 13, a transfer unit 14, a sheet transport mechanism 18, and a sheet feeding unit 15. In addition, a reference numeral 207a in the control panel 207 is a start button which is displayed when the control panel 207 is touched. When the start button 207a is pressed, a signal indicating a start of image forming is transmitted to the control unit 206.

The automatic document feeder 11 can be opened and closed on the upper part of a main body of the MFP 101A. The automatic document feeder 11 includes the original document transport mechanism which takes out original documents from the sheet feeding tray one by one, and transports the original document to a tray for discharged sheets.

The automatic document feeder 11 transports the original documents to the original document reading unit of the scanner 201 one by one using a function of transporting the original document. In addition, it is also possible to place the original document on the original document placing table of the scanner 201 of the automatic document feeder 11.

The scanner 201 includes a carriage including an exposure lamp which exposes light with respect to the original document and a first reflecting mirror, a plurality of second mirrors which move according to a motion of the carriage, a lens block, and a Charge Coupled Device (CCD), for example, as an image reading sensor.

The carriage causes light of the exposure lamp which is reflected from the original document to be reflected in the first reflecting mirror by stopping at the original document reading unit, or by reciprocating under the original document placing table. The second reflecting mirrors cause the reflected light of the first reflecting mirror to be reflected in the lens block. The lens block changes a magnification of the reflected light, and outputs the light to the CCD. The CCD converts the input light into an electric signal, and outputs the signal to the image forming unit 13 as an image signal.

The image forming unit 13 includes non-decolorable toner of yellow Y, magenta M, cyan C, and black K, decolorable toner E, a laser irradiation unit 20a, a photosensitive drum 20b as an electrostatic latent image carrier, and a developing material supply unit 20c.

The laser light irradiation unit 20a radiates laser light to the photosensitive drum 20b based on an image signal, and forms an electrostatic latent image on the photosensitive drum 20b. The developing material supply unit 20c supplies a developing material to the photosensitive drum 20b, and forms an image of the developing material from the electrostatic latent image.

The sheet feeding unit 15 delivers recording mediums to the sheet transport mechanism by taking the recording medium out one by one from a sheet feeding cassette. The sheet transport mechanism transports the recording medium to the transfer unit 14.

The transfer unit 14 includes a transfer belt 14b and a transfer roller 14a. The transfer belt 14b functions as an image carrier. The image of the developing material of the photosensitive drum. 20b is transferred to the transfer belt 14b. The transfer roller 14a transfers the image of the developing material of the transfer belt 14b to the transported recording medium by applying a voltage thereto.

The MFP 101A includes a fixing unit 14c on the downstream side of the transfer unit 14 in the transport direction of the recording medium. The fixing unit 14c fixes the image of the developing material onto the recording medium by heating and pressing the image.

A recording medium P which is discharged from a sheet discharging port is loaded on a tray for discharged sheets 16, and functions as a carrier unit for carrying the recording medium.

Figure 4:
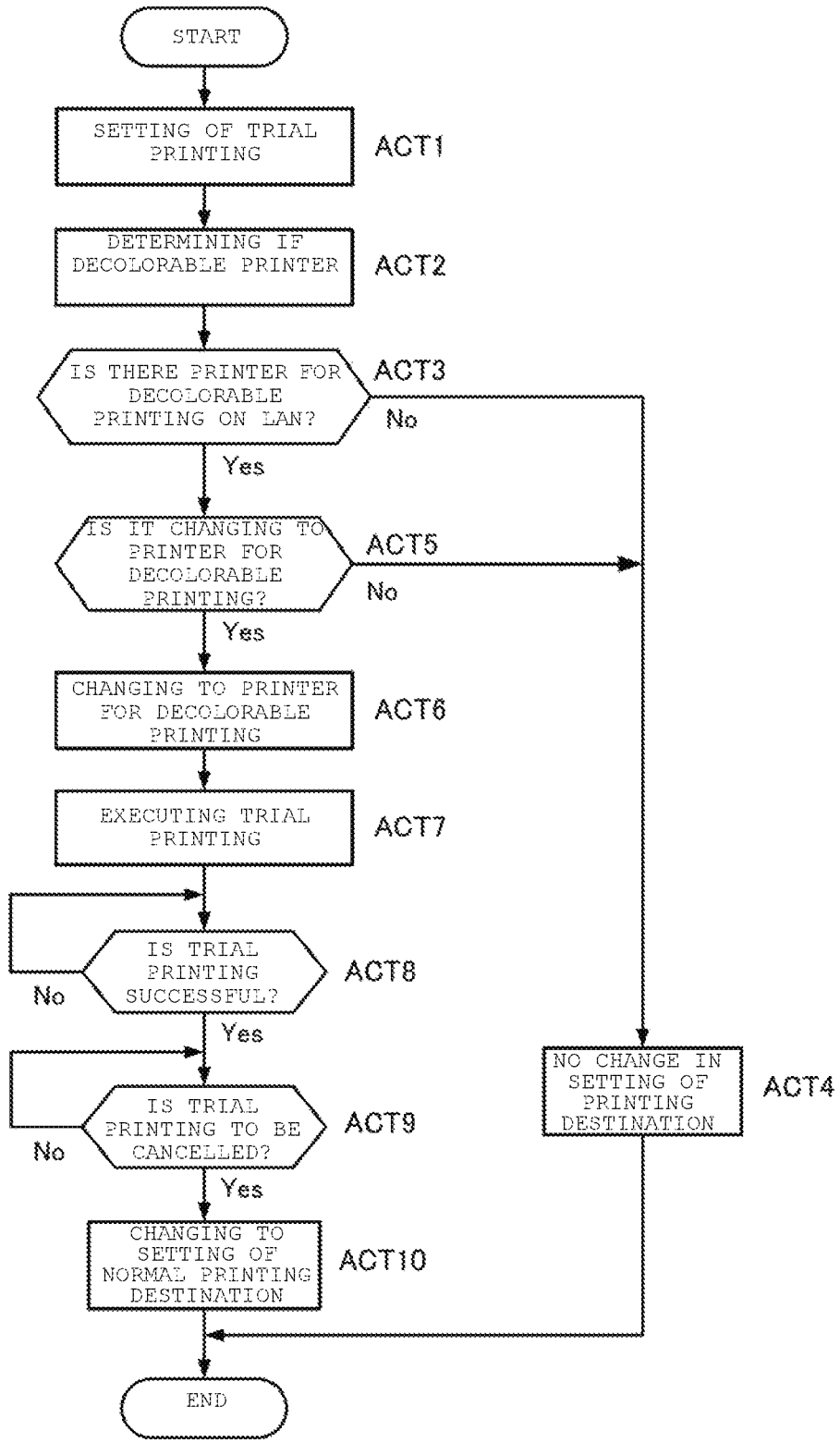
FIG. 4 is a flowchart illustrating operations of trial printing processing of the image forming system, according to an embodiment.

FIG. 4 is a flowchart illustrating operations of the image forming system 100. FIG. 4 illustrates operations of the trial printing in which printing of only one page of a document is performed so as to confirm whether or not it is possible to perform printing of a printed matter according to print settings, before normal printing of the document.

In FIG. 4, setting of "trial printing" is performed according to print settings that were set in a setting menu of the printer driver which is installed to the client PC 103 (ACT 1). Here, it is preferable that the printer driver which is installed to the client PC 103 be a universal print driver which may be used in common in each MFP.

The client PC 103 determines whether or not there is an MFP which may perform decolorable printing (e.g., one of the MFPs 101A and 101B) and which is connected to the LAN 102 (ACT 2), and the process proceeds to ACT 3.

In ACT 3, when the client PC 103 determines that there is no MFP which may perform decolorable printing on the LAN 102 (NO), setting of an MFP as a printing destination is not changed (ACT 4), and the process ends. That is, in this case, the trial printing is performed using normal printing using non-decolorable toner.

In ACT 3, when the client PC 103 determines that there is an MFP, e.g., the MFP 101A, which may perform decolorable printing on the LAN 102 (YES), the process proceeds to ACT 5.

Figure 5:
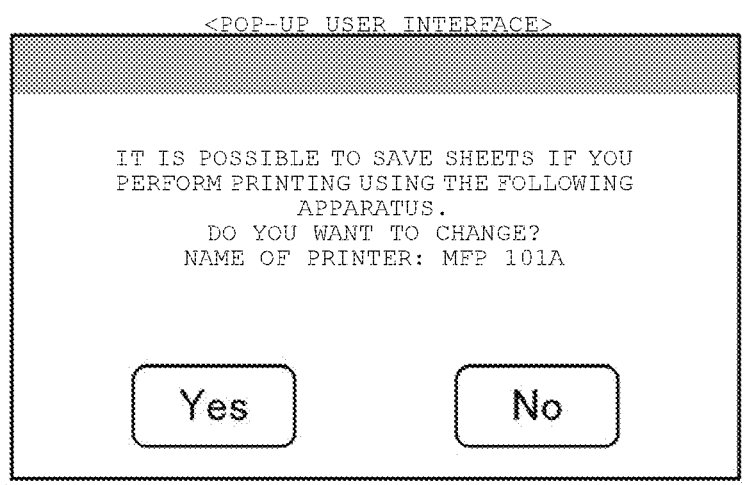
FIG. 5 is a diagram illustrating a display example of a pop-up user interface.

In ACT 5, a pop-up interface (illustrated in FIG. 5) is displayed on a monitor of the client PC 103. The pop-up interface displays the following messages:

"It is possible to save sheets if you perform printing using the following apparatus. Do you want to change?" and "Name of printer: MFP 101A."

A flag is provided for each MFP which may perform decolorable printing, and the MFP is found when the flag is checked. When the checked flag is found, the pop-up interface is displayed.

In ACT 5, when not changing to the printer which may perform decolorable printing (NO), setting of an MFP as a printing destination is not changed (ACT 4), and the process ends. That is, in this case, trial printing in normal printing is performed using non-decolorable toner.

Figure 6:
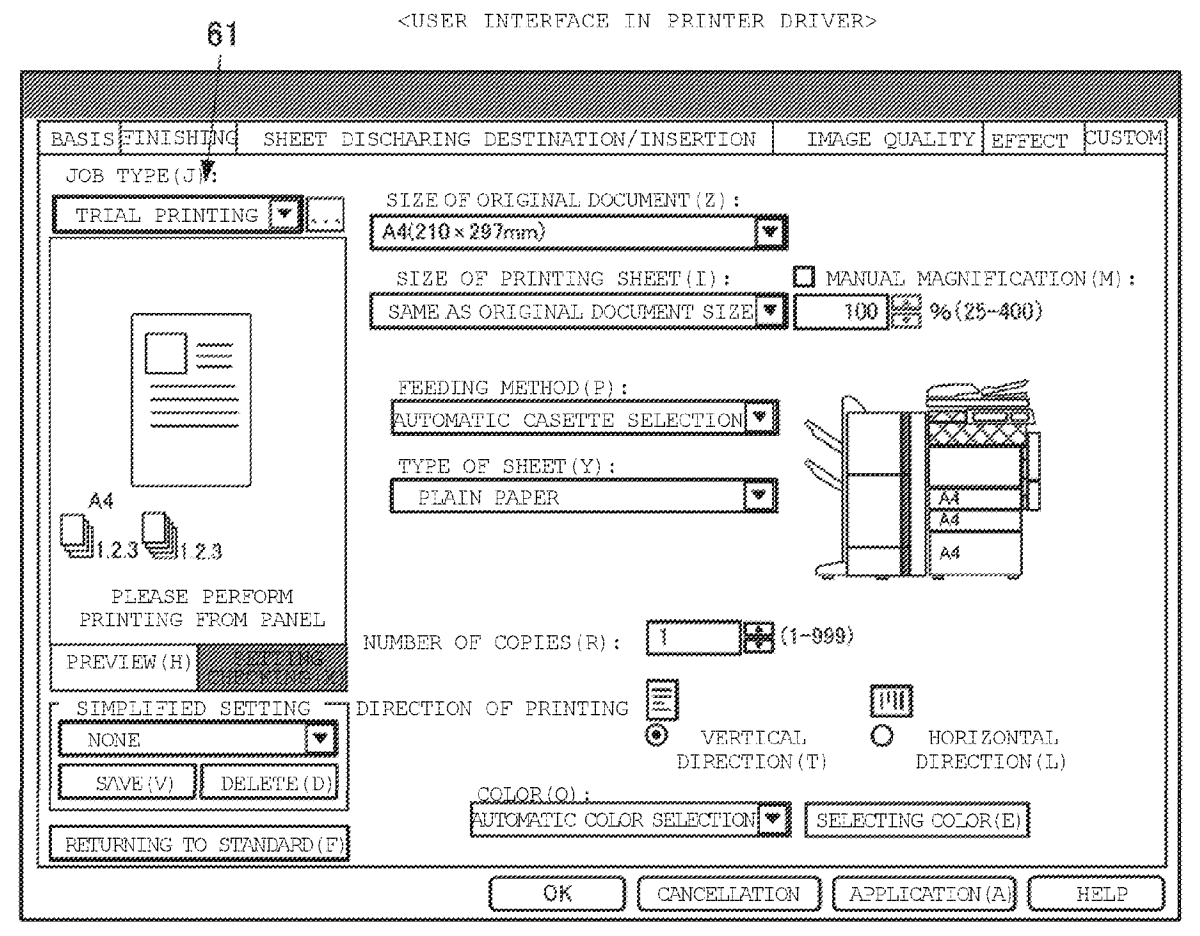

In ACT 5, when changing to the printer which may perform decolorable printing (YES), the process proceeds to ACT 6, and the setting is changed to the MFP 101A which includes a decolorable printing function. In addition, a job type 61 in a drop-down menu in the user interface in the printer driver which is illustrated in FIG. 6 is selected. In addition, the interface here is arbitrarily selected by a user, however, the interface may be forcibly switched.

The job type 61 includes menus of, for example, "normal printing" and "trial printing". The "trial printing" in the menu is clicked, and the trial printing is executed (ACT 7).

After executing the trial printing, "Is the trial printing successful?" (ACT 8), or "Do you want to cancel re-executing of the trial printing?" (ACT 9) is displayed using the pop-up interface again.

When obtaining "YES" in selections of ACTs 8 and 9, respectively, the mode is switched from the printing destination of the MFP which may perform decolorable printing to the printing destination of the MFP which includes the printer which performs the normal printing (ACT 10). In addition, when the current printing destination is the MFP 101A including the printer function which may perform decolorable printing and non-decolorable printing, it is not necessary to switch. When the current printing destination is the printer which may perform decolorable printing exclusively, the printing destination is switched.

When obtaining "NO" in selections of ACTs 8 and 9, respectively, setting of the MFP 101A which may perform decolorable printing is remained as is, in order to perform the trial printing again.

By adopting such a configuration, it is possible to perform trial printing by retrieving the MFP which may perform decolorable printing which is connected to the LAN. In addition, by using a decolored sheet after performing decolorable printing as a normal printing sheet again, it is possible to further effectively use the sheet.

In addition, the trial printing in FIG. 4 is described such that the trial printing is performed in the MFP 101A which includes functions of decolorable and non-decolorable printing, using the printer driver in the client PC 103. As a matter of course, there also is a case in which the trial printing is performed in the MFP 101A itself. In this case, it is understood that the functions of decolorable and non-decolorable printing are included in the printer driver in advance. Accordingly, it is possible to perform the trial printing instantly, without retrieving the printer including the functions of decolorable and non-decolorable printing which is connected to the LAN 102.

The retrieving of the MFP which may perform decolorable printing which is connected to the LAN 102 according to the above described embodiment is performed such that a flag is provided in the target MFP, and the checked flag is found. In addition to this, a device list is provided to find the MFP which may perform decolorable printing between the MFPs. In addition, when finding the apparatus which is listed on the device list during retrieving, the pop-up user interface may be displayed.

In addition, a configuration may be adopted in which the apparatus which may perform decolorable printing is registered in advance in the printer driver, and the pop-up user interface is displayed when there is a request for the trial printing, without performing retrieving.

There is no case of being limited to each of the above described embodiments. For example, in ACTs 8 and 9 in FIG. 4, the message of "Is the trial printing successful?", or "Do you want to cancel re-executing of the trial printing?" is displayed by the pop-up user interface again, after executing the trial printing. A configuration may be adopted in which, when the trial printing is successful in ACT 8, the process ends, and when the trial printing is not successful, the process proceeds to ACT 9, and whether or not to cancel the trial printing is determined.

In addition, it may be changed to an MFP which may perform printing on a sheet using the decolorable toner, having a combination of monochrome printing, layout printing in which a printing format such as printing of two images or four images on one sheet is displayed, duplex printing, or the like, using a combination of printing settings.

In addition, the image forming unit of the MFP includes non-decolorable toner of yellow Y, magenta M, cyan C, and black K, and the decolorable toner E, however, the image forming unit may include non-decolorable toner of yellow Y, magenta M, and cyan C, and the decolorable toner E instead of black K (Y, M, C, E). In addition, the image forming unit may be a unit for monochrome printing exclusively. In such a case, it may be a combination of the non-decolorable toner of black K and the decolorable toner E (K, E).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming system comprising:
   a first image forming apparatus configured to form an image using at least a decolorable color material;
   a second image forming apparatus separate from the first image forming apparatus and configured to form an image using a non-decolorable color material; and
   an information terminal in communication over a network with the first and second image forming apparatuses, wherein, when a trial printing operation is initiated from the information terminal, the information terminal is configured to prompt a user for an input selecting the first image forming apparatus to perform the trial printing operation using the decolorable color material.

2. The system according to claim 1, wherein the first image forming apparatus is configured to selectively perform image forming using the decolorable color material and the non-decolorable color material.

3. The system according to claim 2, wherein the trial printing using the first image forming apparatus is initiated through the network.

4. The system according to claim 1, wherein, when the trial printing operation is initiated from the information terminal, information regarding whether the first image forming apparatus is connected to the network is retrieved, and when the first image forming apparatus is connected to the network, the information terminal is configured to prompt the user for an input selecting the first image forming apparatus to perform non-trial printing using decolorable color material.

5. The system according to claim 1, wherein, when the trial printing operation is initiated from the information terminal, information regarding whether the first image forming apparatus is connected to the network is retrieved, and when the first image forming apparatus is not connected to the network, the trial printing is performed using the second image forming apparatus.

6. The system according to claim 1, wherein, when the trial printing operation is initiated from the information terminal, information regarding whether the first image forming apparatus is connected to the network is retrieved, and when the first image forming apparatus is connected to the network trial printing is performed by the first image forming apparatus, and non-trial printing is performed by one of the first and second image forming apparatuses which has been set as a printing destination.

7. The system according to claim 1, wherein
a flag is provided for the first image forming apparatus indicating that the first image forming apparatus is capable of image forming using the decolorable color material, and
when the trial printing operation is initiated, the flag is found and a pop-up user interface is displayed on the information terminal indicating that decolorable printing is available.

8. The system according to claim 7, wherein the first image forming apparatus is registered in advance in a printer driver of the information terminal.

9. A method of image forming in an image forming system, the method comprising the steps of:
communicating, over a network, between an information terminal and a first image forming apparatus configured to form an image using at least a decolorable color material and a second image forming apparatus that is separate from the first image forming apparatus and configured to form an image using a non-decolorable color material;
initiating a trial printing operation from the information terminal;
accepting, in the information terminal, an input selecting the first image forming apparatus to perform the trial printing operation using the decolorable color material; and
performing the trial printing operation in the first image forming apparatus using the decolorable color material.

10. The method according to claim 9, wherein the first image forming apparatus is configured to selectively perform image forming using the decolorable color material and the non-decolorable color material.

11. The method according to claim 10, wherein the trial printing is initiated through the network.

12. The method according to claim 9, wherein, when the trial printing operation is initiated from the information terminal, information regarding whether the first image forming apparatus is connected to the network is retrieved.

13. The method according to claim 12, further comprising the step of:
performing non-trial printing in an image forming apparatus which has been set as a printing destination.

14. The method according to claim 9, wherein a flag is provided for the first image forming apparatus indicating that the first image forming apparatus is capable of image forming using the decolorable color material, the method further comprising the steps of:
finding the flag when the trial printing operation is initiated; and
displaying a pop-up user interface on the information terminal indicating that decolorable printing is available.

15. The method according to claim 9, wherein the first image forming apparatus is registered in advance in a printer driver of the information terminal.

16. A non-transitory computer-readable medium containing instructions causing an information terminal to perform the steps of:
communicating, over a network, between the information terminal and a first image forming apparatus configured to form an image using at least a decolorable color material and a second image forming apparatus that is separate from the first image forming apparatus and configured to form an image using a non-decolorable color material;
initiating a trial printing operation from the information terminal;
accepting, in the information terminal, an input selecting the first image forming apparatus to perform the trial printing operation using the decolorable color material; and
transmitting instructions to the first image forming apparatus to perform the trial printing operation using the decolorable color material.

17. The non-transitory computer-readable medium according to claim 16, wherein, when the trial printing operation is initiated from the information terminal, the instructions cause the information terminal to retrieve information regarding whether the first image forming apparatus is connected to the network.

18. The non-transitory computer-readable medium according to claim 16, the instructions further causing the information terminal to perform the step of:
transmitting instructions to an image forming apparatus which has been set as a printing destination to perform a non-trial printing operation.

19. The non-transitory computer-readable medium according to claim 16, wherein a flag is provided for the first image forming apparatus indicating that the first image forming apparatus is capable of image forming using the decolorable color material, the instructions further causing the information terminal to perform the steps of:
finding the flag when the trial printing operation is initiated; and displaying a pop-up user interface on the information terminal indicating that decolorable printing is available.

20. The non-transitory computer-readable medium according to claim 16, wherein the first image forming apparatus is registered in advance in a printer driver of the information terminal.

* * * * *